US009637028B2

(12) United States Patent
Ewald et al.

(10) Patent No.: US 9,637,028 B2
(45) Date of Patent: May 2, 2017

(54) LONGITUDINAL ADJUSTER FOR A VEHICLE SEAT

(75) Inventors: Tobias Ewald, Hückeswagen (DE); Alfons Steilmann, Kirchhundem (DE); Thomas Willing, Köln (DE); Christoph Beckers, Neuss (DE); Erhard Hassler, Bad Laasphe (DE); Matthias von Berg, Hilchenbach (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 13/876,260

(22) PCT Filed: Sep. 26, 2011

(86) PCT No.: PCT/EP2011/004797
§ 371 (c)(1),
(2), (4) Date: Jun. 7, 2013

(87) PCT Pub. No.: WO2012/041470
PCT Pub. Date: Apr. 5, 2012

(65) Prior Publication Data
US 2013/0248675 A1 Sep. 26, 2013

(30) Foreign Application Priority Data
Sep. 30, 2010 (DE) .................. 10 2010 047 043

(51) Int. Cl.
B60N 2/07 (2006.01)
(52) U.S. Cl.
CPC .............. B60N 2/07 (2013.01); B60N 2/073 (2013.01); B60N 2/0705 (2013.01); B60N 2/0715 (2013.01); B60N 2/0722 (2013.01); B60N 2/0727 (2013.01)

(58) Field of Classification Search
CPC ......................................... B60N 2/07
USPC ........................................ 248/430
See application file for complete search history.

(56) References Cited

U.S. PATENT DOCUMENTS

| 4,811,925 A | * | 3/1989 | Fujita et al. ................. 248/430 |
| 5,046,698 A | * | 9/1991 | Venier ........................ 248/430 |
| 5,213,300 A | * | 5/1993 | Rees ..................... B60N 2/0715 |
| | | | 248/429 |

(Continued)

FOREIGN PATENT DOCUMENTS

| DE | 195 30 266 A1 | 2/1997 |
| DE | 100 62 346 A1 | 7/2001 |

(Continued)

OTHER PUBLICATIONS

Notification of Transmittal of Translation of the International Preliminary Report on Patentability mailed Apr. 11, 2013, as received in corresponding International Application No. PCT/EP2011/004797.

(Continued)

Primary Examiner — Jonathan Liu
Assistant Examiner — Chiedu Chibogu
(74) Attorney, Agent, or Firm — Foley & Lardner LLP

(57) ABSTRACT

A longitudinal adjuster in the interior of a motor vehicle, has an upper and a lower rail, between which at least one rolling body is provided. A projection is provided on the upper and/or lower rail, the projection forming a local contact point between the two rails.

4 Claims, 2 Drawing Sheets

(56) References Cited

U.S. PATENT DOCUMENTS

| | | | | |
|---|---|---|---|---|
| 5,222,814 | A | * | 6/1993 | Boelryk .......................... 384/47 |
| 5,516,071 | A | * | 5/1996 | Miyauchi ............. B60N 2/0705 248/429 |
| 5,529,397 | A | | 6/1996 | Yoshida |
| 5,741,000 | A | * | 4/1998 | Goodbred ..................... 248/430 |
| 5,755,421 | A | * | 5/1998 | Meier et al. .................. 248/429 |
| 6,435,465 | B1 | * | 8/2002 | Yamada et al. ............... 248/429 |
| 6,464,194 | B1 | * | 10/2002 | Armo .................... B60N 2/0705 248/430 |
| 7,104,584 | B2 | * | 9/2006 | Moriyama ........... B60N 2/0232 296/65.14 |
| 7,328,877 | B2 | * | 2/2008 | Yamada et al. ............... 248/430 |
| 7,503,614 | B2 | * | 3/2009 | Yamada et al. ............. 296/65.13 |
| 7,931,246 | B2 | * | 4/2011 | Brewer et al. ................. 248/429 |
| 8,029,063 | B2 | * | 10/2011 | Kazyak ................ B60N 2/0705 248/429 |
| 2005/0056761 | A1 | * | 3/2005 | Danjo .................... B60N 2/072 248/429 |
| 2005/0145768 | A1 | * | 7/2005 | Rohee .................... B60N 2/073 248/430 |

FOREIGN PATENT DOCUMENTS

| | | |
|---|---|---|
| EP | 1 516 772 A2 | 3/2005 |
| JP | 07-329616 | 12/1995 |
| JP | 2004-148854 | 5/2004 |
| JP | 2005-088751 | 4/2005 |

OTHER PUBLICATIONS

German Examination Report received in connection with German application No. DE 10 2010 047 043.0; dtd Jun. 29, 2011.

International Search Report (English)received in connection with international application No. PCT/EP2011/004797; dtd Dec. 19, 2012.

International Search Report and Written Opinion received in connection with international application No. PCT/EP2011/004797; dtd Dec. 19, 2012.

Office Action dated May 13, 2014 in Japanese Application No. 2013-530613 along with English translation.

* cited by examiner

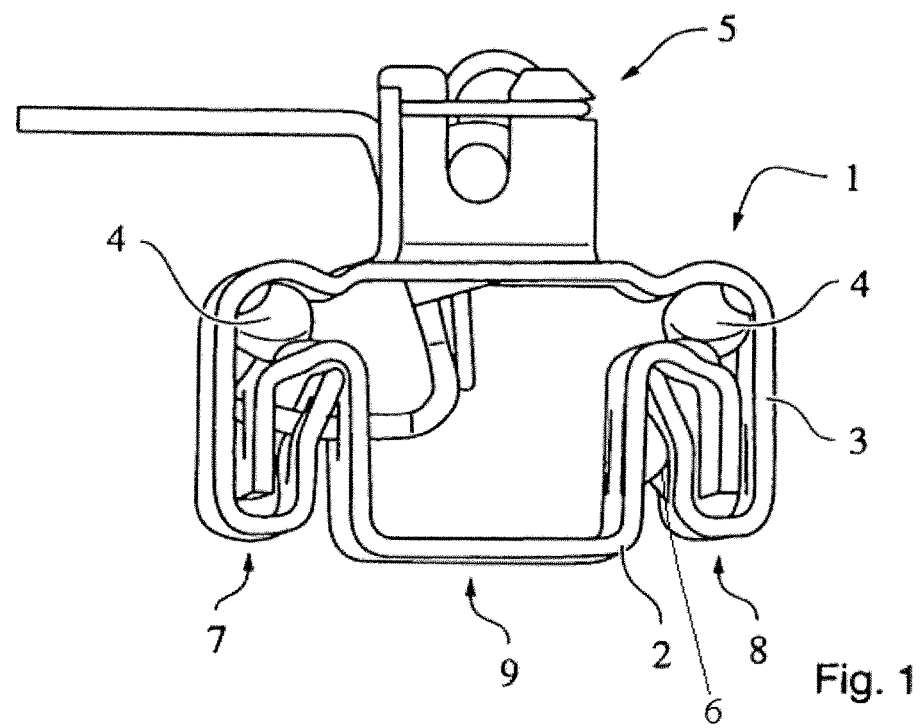
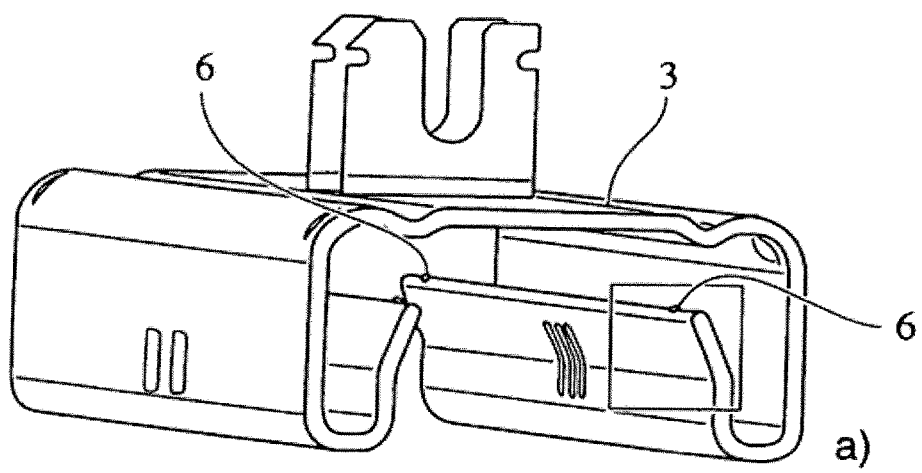
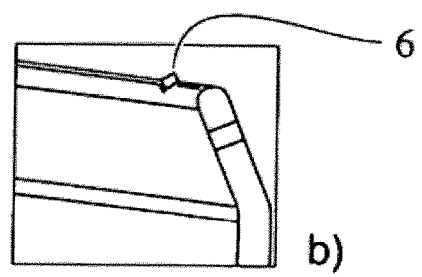
Fig. 1
Fig. 2

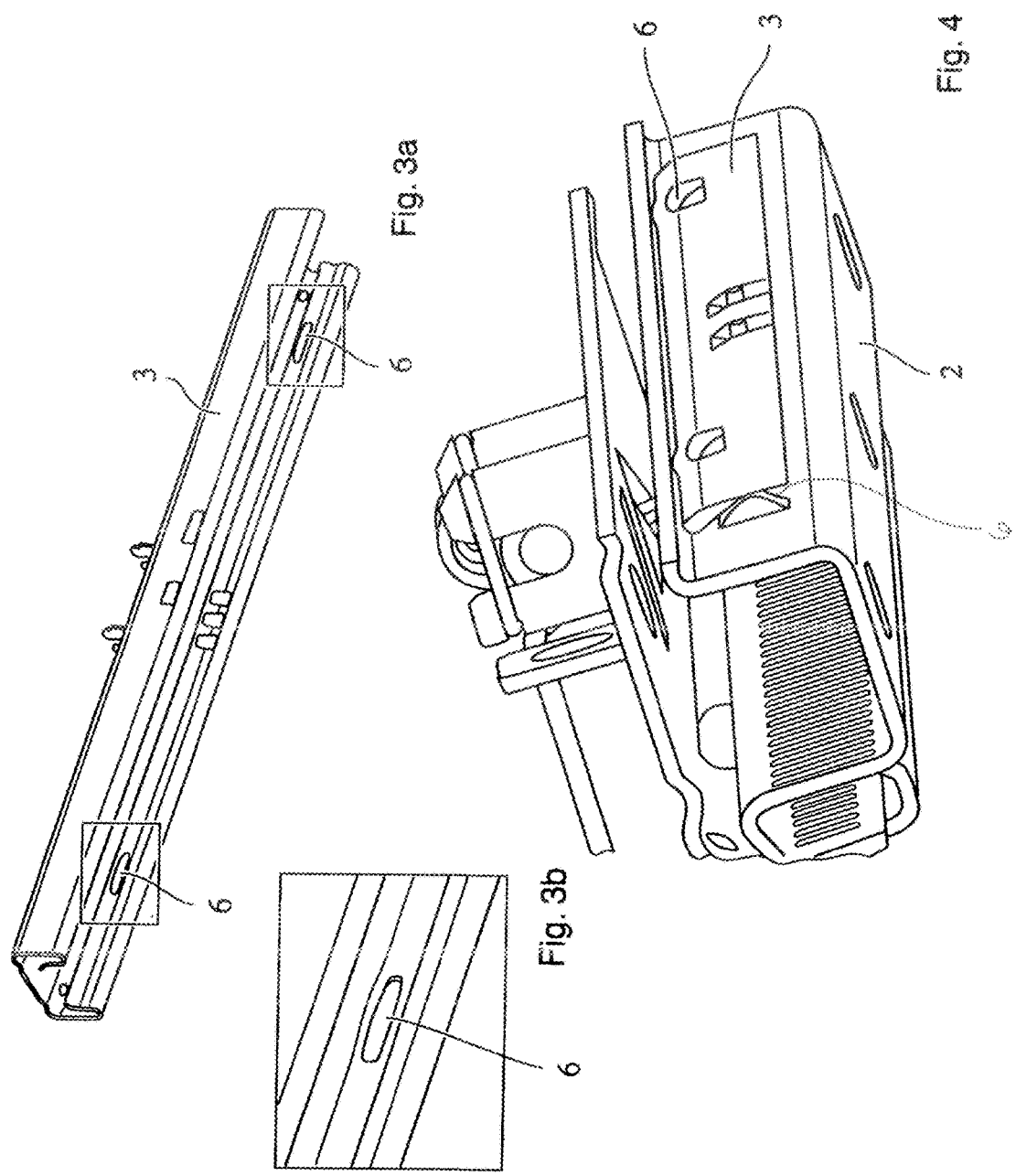

LONGITUDINAL ADJUSTER FOR A VEHICLE SEAT

CROSS REFERENCE TO RELATED APPLICATIONS

The present application is a National Stage of International Application No. PCT/EP2011/004797 filed on Sep. 26, 2011, which claims the benefit of German Patent Application No. 10 2010 047 043.0 filed on Sep. 30, 2010, the entire disclosures of which are incorporated herein by reference.

The present invention relates to a longitudinal adjuster in the vehicle inner space of a motor vehicle having an upper and a lower rail, between which at least one roller member is provided. Furthermore, the present invention relates to a vehicle seat having the longitudinal adjuster according to the invention.

Longitudinal adjusters of the generic type are adequately known from the prior art and are in particular used to adjust a vehicle seat in the longitudinal direction, that is to say, in the X direction of a vehicle, in order to adapt the seat to the body size of the corresponding seat occupant and/or to move the vehicle seat, for example, into an Easy Entry position. Owing to production tolerances, in these seat adjusters complex adaptation steps are often necessary and/or noises occur during operation.

An object of the present invention was therefore to provide a longitudinal adjuster which does not have the disadvantages of the prior art.

The object is achieved with a longitudinal adjuster in the vehicle inner space of a motor vehicle having an upper and a lower rail, between which at least one roller member is provided, there being provided on the upper and/or lower rail a projection which forms a local contact point between the two rails.

The present invention relates to a longitudinal adjuster in the inner space of a motor vehicle. In particular, it is a longitudinal adjuster of a vehicle seat. Such longitudinal adjusters have an upper and a lower rail, the upper rail being connected, for example, to the seat member of the vehicle seat and the lower rail being connected to the bodywork of the vehicle. For longitudinal adjustment, the upper rail is provided so as to be able to be displaced relative to the lower rail and preferably so as to be able to be secured in the desired position. Between the two rails, there is/are provided at least one, preferably a plurality of, roller member(s), in particular balls, which reduce the friction during the adjustment operation.

The longitudinal adjuster, with respect to the cross-section, preferably has at least two contact regions in which roller members are provided, that is to say, in which the two rails are supported one on the other.

According to the invention, there is arranged on the upper and/or lower rail, in particular per contact region, a projection which forms a local contact point between the two rails, that is to say, the lower rail and upper rail are in direct mutual abutment at the projection. Preferably, the upper and the lower rail are in direct mutual abutment exclusively at the projection.

The longitudinal adjuster preferably has two such projections, in particular per contact region. The projections are preferably provided in a state spaced apart from each other with respect to the longitudinal direction (X direction) of the rails.

Preferably, the projection is provided integrally with the upper and/or lower rail, that is to say, in a particularly preferred manner, the projection is produced by means of shaping from the upper and/or lower rail. In particular, the projection is produced by means of stamping or bending. Optionally, only a region is punched from the upper and/or lower rail and then plastically deformed so that it forms the projection according to the invention.

In another preferred embodiment of the present invention, the projection is provided so as to be resilient and, in a quite particularly preferred manner, it is clamped between the two rails, that is to say, resiliently deformed.

The projection is preferably provided on the upper rail of the longitudinal adjuster.

The longitudinal adjuster is particularly suitable for the longitudinal adjustment of a vehicle seat.

Therefore, the present invention further relates to a vehicle seat having a longitudinal adjuster according to one of the preceding claims.

The upper rail is preferably fixedly connected to the seat member of the vehicle seat and the lower rail is preferably fixedly connected to the bodywork of the vehicle. The upper rail is provided so as to be able to be displaced relative to the lower rail for longitudinal adjustment and can be temporarily fixed in the respective position by a securing means.

The invention is explained below with reference to FIGS. 1 to 3. These explanations are given purely by way of example and do not limit the general notion of the invention. These explanations apply equally well to all aspects of subject-matter of the present invention.

FIG. 1 is a first embodiment of the longitudinal adjuster according to the invention;

FIG. 2 shows the upper rail of the longitudinal adjuster according to FIG. 1;

FIG. 3a shows another embodiment of an upper rail of a longitudinal adjuster according to the invention;

FIG. 3b is an enlarged view of a portion of FIG. 3a.

FIG. 1 shows the longitudinal adjuster 1 according to the invention. It has a lower rail 2 which is preferably provided in a fixed manner, for example, on the bodywork of a vehicle. An upper rail 3 is provided so as to be able to be longitudinally displaced relative thereto. The upper rail 3 is supported, with respect to the cross-section, in two contact regions 7, 8 on the lower rail, in which the upper rail is guided on the lower rail. The contact regions 7, 8 are preferably arranged at the left and the right of a preferably U-shaped central region 9 of the cross-section of the lower rail 2. In the contact regions 7, 8, roller members, in this instance balls 4, are provided between the two rails 2, 3. In order to be able to secure the vehicle seat in the desired position in each case, the longitudinal adjuster preferably has a securing means 5 which releasably secures the upper rail 3 relative to the lower rail. In the present instance, the longitudinal adjuster has two contact regions between the upper and the lower rail.

As can be seen in FIG. 1, but also in particular FIG. 2, two projections 6 are provided per contact region 7, 8. The upper and the lower rail come into contact preferably only at these two projections 6, which are provided integrally with the upper rail and which are provided by means of shaping, in particular stamping or bending, from the material of the upper rail. The projections 6 substantially produce point-like contacts and consequently a defined contact face between the upper and lower rail so that the friction is reduced when the upper rail is moved relative to the lower rail and rotation of the rails relative to each other can be compensated for. Preferably, the projections 6 are resiliently deformed between the two rails 2, 3, whereby production tolerances can be compensated for. The projections 6 are preferably provided at the side of the lower rail opposing the roller members 4. Owing to the resilient force of the projections 6, a slight pressure is preferably applied to the roller members which in particular reduces the production of noise. In order to compensate for excessively large production tolerances, roller members of different sizes can further be used.

FIG. 3 shows another embodiment of the upper rail. In the present instance, the upper rail has two preferably punched and/or shaped projections 6 which are preferably constructed in the present instance as resilient elements and which are resiliently clamped after assembly between the upper and lower rail. Preferably, two such projections are provided per contact region. Otherwise, reference is made to the explanations according to FIGS. 1 and 2.

According to another embodiment (not shown), the projections are again formed from the material of the upper rail. The lower rail preferably abuts the upper, semi-circular portion the projection. This projection is preferably also resiliently deformed between the two rails. Preferably, two such projections are provided per contact region. A projection is also on the lower rail. Otherwise, reference is made to the explanations according to FIGS. 1 and 2.

LIST OF REFERENCE NUMERALS

1 Longitudinal adjustment
2 Lower rail
3 Upper rail
4 Roller members
5 Securing means
6 Projection, formation
7 Contact region
8 Contact region
9 Central region of the cross-section of the lower rail

The invention claimed is:

1. A longitudinal adjuster for the vehicle inner space of a motor vehicle, comprising:
   an upper rail;
   a lower rail;
   at least one roller member provided between the upper rail and the lower rail; and
   at least one projection provided on the upper rail and at least one projection provided on the lower rail, wherein the projections on the upper rail and the lower rail form local contact points between the upper rail and lower rail,
   wherein the at least one projection on the upper rail is provided integrally with the upper rail by being shaped from material of the upper rail,
   wherein the at least one projection on the lower rail is provided integrally with the lower rail by being shaped from material of the lower rail,
   wherein the projections on the upper rail and the lower rail are stamped or bent,
   wherein the projections on the upper rail and the lower rail are clamped between the upper rail and the lower rail in order to be resiliently deformable between the upper rail and the lower rail and to compensate for production tolerances,
   wherein the lower rail includes a central region having a substantially U-shaped cross-section, wherein the central region includes inner sides that face toward one another in a lateral direction and outer sides that face away from one another in the lateral direction, wherein the at least one projection on the lower rail is stamped or bent to extend outward in the lateral direction from the outer sides of the central region,
   wherein the lower rail includes an outwardly extending portion that extends outwardly from the central region, wherein the outwardly extending portion includes a first surface and a second surface, wherein the first surface and the second surface directly oppose each other through the thickness of the outwardly extending portion,
   wherein the at least one roller member directly contacts the first surface,
   wherein the at least one projection on the upper rail is located on an end of an inwardly-extending portion of the upper rail, wherein the inwardly-extending portion is inclined relative to the vertical direction such that the at least one projection on the upper rail directly contacts an intersection between one of the outer sides of the central region and the second surface of the outwardly extending portion of the lower rail,
   wherein the at least one projection on the lower rail does not extend substantially along the length of the lower rail,
   wherein the at least one projection on the upper rail contacts the lower rail at a point,
   wherein the at least one projection on the lower rail contacts the upper rail at a point,
   wherein the lower rail and the upper rail are configured to directly interlock with and contact one another exclusively at the at least one projection on the upper rail and the at least one projection on the lower rail,
   wherein the at least one projection on the upper rail and the at least one projection on the lower rail are configured such that the longitudinal adjuster is resilient in substantially the vertical direction,
   wherein the vertical direction is perpendicular to the longitudinal direction, wherein at least one of the lower rail and the upper rail are adjustable along an axis parallel to the longitudinal direction.

2. The longitudinal adjuster as claimed in claim 1, wherein the at least one projection on the upper rail includes two projections.

3. The longitudinal adjuster as claimed in claim 1, wherein the at least one projection on the upper rail is configured to apply a resilient force to the at least one roller member.

4. The longitudinal adjuster as claimed in claim 1, wherein the outwardly extending portion of the lower rail extends outwardly from the central region laterally beyond the at least one projection on the lower rail.

* * * * *